US008011103B2

(12) United States Patent
Blum

(10) Patent No.: US 8,011,103 B2
(45) Date of Patent: Sep. 6, 2011

(54) DUAL WHEEL PIZZA CUTTER

(75) Inventor: Matthew Blum, Chicago, IL (US)

(73) Assignee: Sears Brands, LLC, Hoffman Estates, IL (US)

( * ) Notice: Subject to any disclaimer, the term of this patent is extended or adjusted under 35 U.S.C. 154(b) by 176 days.

(21) Appl. No.: 12/428,637

(22) Filed: Apr. 23, 2009

(65) Prior Publication Data
US 2010/0269359 A1    Oct. 28, 2010

(51) Int. Cl.
*B26B 3/00* (2006.01)
(52) U.S. Cl. .................. 30/299; 30/306; 30/307
(58) Field of Classification Search ............ 30/292, 30/306, 307, 319, 365, 287, 299; D7/694; D3/18; D8/98
See application file for complete search history.

(56) References Cited

U.S. PATENT DOCUMENTS

| | | | | | |
|---|---|---|---|---|---|
| 278,103 | A | * | 5/1883 | Curtis | 30/307 |
| 312,043 | A | * | 2/1885 | Van Horn | 30/292 |
| 482,830 | A | * | 9/1892 | Morgan | 30/319 |
| 552,267 | A | * | 12/1895 | Westphalin | 30/292 |
| 677,337 | A | * | 7/1901 | Cameron | 30/307 |
| 881,828 | A | * | 3/1908 | Schmit | 30/369 |
| 895,969 | A | * | 8/1908 | Coyle | 30/307 |
| 900,300 | A | * | 10/1908 | Nicolas | 30/319 |
| 1,165,022 | A | * | 12/1915 | Rice | 30/319 |
| 1,232,398 | A | * | 7/1917 | Sheldon | 30/292 |
| 1,321,215 | A | * | 11/1919 | Kollar | 30/319 |
| D149,551 | S | * | 5/1948 | Gruber | D7/694 |
| 2,947,084 | A | * | 8/1960 | Billings | 33/32.2 |
| D199,261 | S | * | 9/1964 | Murphy | D7/694 |
| D200,335 | S | * | 2/1965 | Larson | D7/694 |
| 3,281,938 | A | * | 11/1966 | Lee | 30/365 |
| D207,336 | S | * | 4/1967 | Giovannini | D7/694 |
| 3,363,314 | A | * | 1/1968 | O'Brien | 30/287 |
| D222,380 | S | * | 10/1971 | Fraioli | D7/694 |
| D235,704 | S | * | 7/1975 | Tyroler | 30/365 |
| 3,924,328 | A | * | 12/1975 | Mould | 30/307 |

(Continued)

FOREIGN PATENT DOCUMENTS

JP    52028782 A * 3/1977

OTHER PUBLICATIONS

WMF Profi Plus Stainless Steel Double Wheel Cutter, Mar. 20, 2006, pp. 1-4.*

(Continued)

*Primary Examiner* — Jason Daniel Prone
(74) *Attorney, Agent, or Firm* — Greenberg Traurig, LLP

(57) ABSTRACT

A pizza cutter has a body portion, a front cutting wheel rotatably coupled to the body portion, and a rear cutting wheel rotatably coupled to the body portion. The front cutting wheel and the rear cutting wheel are aligned in a cutting direction. A top of the body portion opposite the front cutting wheel and the rear cutting wheel has a graspable handle. Adjacent to the handle and positioned generally over the front cutting wheel and/or the rear cutting wheel the body portion is provided with an upswept corner. The body portion also provides a front cutting wheel well and a rear cutting wheel well with the front cutting wheel well covering a portion of one side of the front cutting wheel, the rear cutting wheel well covering a portion of one side of the rear cutting, and the opposite sides of the front cutting wheel and the rear cutting wheel remain exposed.

6 Claims, 5 Drawing Sheets

U.S. PATENT DOCUMENTS

| | | | | |
|---|---|---|---|---|
| 4,001,936 | A | * | 1/1977 | Matsushita ............... 30/287 |
| 4,020,550 | A | * | 5/1977 | Okada ...................... 30/292 |
| 4,155,142 | A | * | 5/1979 | Demetriadis ........... 15/236.06 |
| D260,223 | S | * | 8/1981 | De Coster ................. D7/694 |
| 4,738,028 | A | * | 4/1988 | Belokin et al. ............ 30/319 |
| 4,809,437 | A | * | 3/1989 | Saliaris .................... 30/319 |
| 4,993,157 | A | * | 2/1991 | Wang ........................ 30/307 |
| 5,299,355 | A | * | 4/1994 | Boda et al. ............... 30/292 |
| D350,462 | S | * | 9/1994 | La Gro ..................... D7/694 |
| 5,355,588 | A | * | 10/1994 | Brandenburg et al. ... 30/319 |
| D354,887 | S | * | 1/1995 | Hawkins ................... D7/694 |
| D355,815 | S | * | 2/1995 | La Gro ..................... D7/694 |
| 5,428,898 | A | * | 7/1995 | Hawkins .................. 30/319 |
| 5,469,622 | A | * | 11/1995 | Gradoni ................... 30/131 |
| 5,504,998 | A | * | 4/1996 | Nguyen .................... 30/319 |
| 5,555,625 | A | * | 9/1996 | Scheminger ............. 30/319 |
| 5,711,077 | A | * | 1/1998 | Schulz et al. ............. 30/319 |
| D393,987 | S | | 5/1998 | Molo |
| D397,001 | S | * | 8/1998 | Antista et al. ............ D7/694 |
| 5,860,217 | A | * | 1/1999 | Braun ....................... 30/300 |
| 6,044,565 | A | * | 4/2000 | Arend et al. .............. 30/319 |
| D430,475 | S | * | 9/2000 | Hirai ......................... D8/98 |
| D433,912 | S | * | 11/2000 | Kellander et al. ......... D8/98 |
| D448,611 | S | | 10/2001 | Ancona et al. |
| 6,484,407 | B2 | * | 11/2002 | Khatchadourian et al. ..... 30/319 |
| 6,857,192 | B1 | * | 2/2005 | Summers et al. .......... 30/299 |
| D509,114 | S | | 9/2005 | McGuyer |
| D519,334 | S | | 4/2006 | Molenaar |
| 7,591,072 | B2 | * | 9/2009 | Stravitz ...................... 30/50 |
| D614,460 | S | * | 4/2010 | Grace et al. ............... D7/694 |
| D614,925 | S | * | 5/2010 | Blum ......................... D7/694 |
| 7,823,292 | B1 | * | 11/2010 | Castiglione et al. ...... 30/299 |
| 2004/0177515 | A1 | * | 9/2004 | Horton ...................... 30/319 |
| 2004/0231475 | A1 | * | 11/2004 | Cornfield et al. ......... 30/319 |
| 2007/0294898 | A1 | * | 12/2007 | Beltran ..................... 30/307 |
| 2008/0010838 | A1 | * | 1/2008 | Kortleven et al. ......... 30/319 |
| 2010/0263217 | A1 | * | 10/2010 | Baxter et al. .............. 30/287 |

OTHER PUBLICATIONS

Deposits Published Under the 1960 Act, Mar. 21, 2006, p. 18 of 36.*
Culinare: gift ideas—Magislice Pizza Cutter, prior art, http://www.culinare.com/gift_ideas/default.asp.
Amazon.com: WMF Profi Plus Stainless Steel Double Wheel Pizza Cutter, prior art, http://www.amazon.com/WMF-Profi-Stainless-Double-Cutter/dp/B000...

* cited by examiner

DUAL WHEEL PIZZA CUTTER

BACKGROUND

Pizza cutters are known in the art. By way of example, U.S. Pat. Nos. D519,334; D509,114; D448,611; and D393,987 each illustrate a pizza cutter having a single wheel which is used to cut a pizza. Pizza cutters having multiple wheels, such as the Culinare Magislice and the WMF Profi Plus brand pizza cutters, are also known in the art.

SUMMARY

A novel dual wheel pizza cutter is hereinafter described. More particularly, the pizza cutter has a body portion, a front cutting wheel rotatably coupled to the body portion, and a rear cutting wheel rotatably coupled to the body portion. The front cutting wheel and the rear cutting wheel are aligned in a cutting direction. A top of the body portion opposite the front cutting wheel and the rear cutting wheel has a graspable handle. Adjacent to the handle and positioned generally over the front cutting wheel and/or the rear cutting wheel the body portion may be provided with an upswept corner. The body portion may also provide a front cutting wheel well and a rear cutting wheel well with the front cutting wheel well covering a portion of one side of the front cutting wheel, the rear cutting wheel well covering a portion of one side of the rear cutting, with the opposite sides of the front cutting wheel and the rear cutting wheel remaining exposed.

A better understanding of the objects, advantages, features, properties and relationships of the novel dual wheel pizza cutter will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the dual wheel pizza cutter reference may be had to the following drawings in which.

DETAILED DESCRIPTION

Figure 1:
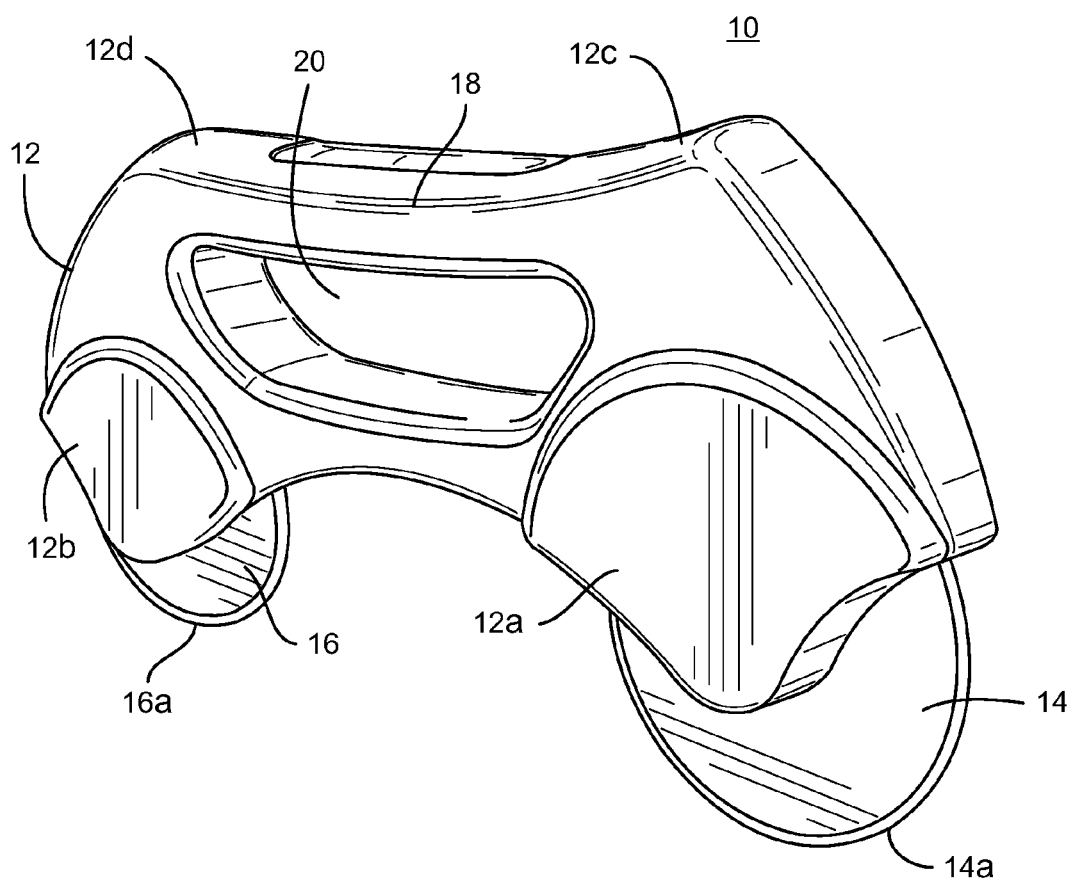
FIG. 1 is a front, right side perspective view of an exemplary dual wheel pizza cutter constructed according to the invention.
Figure 2:
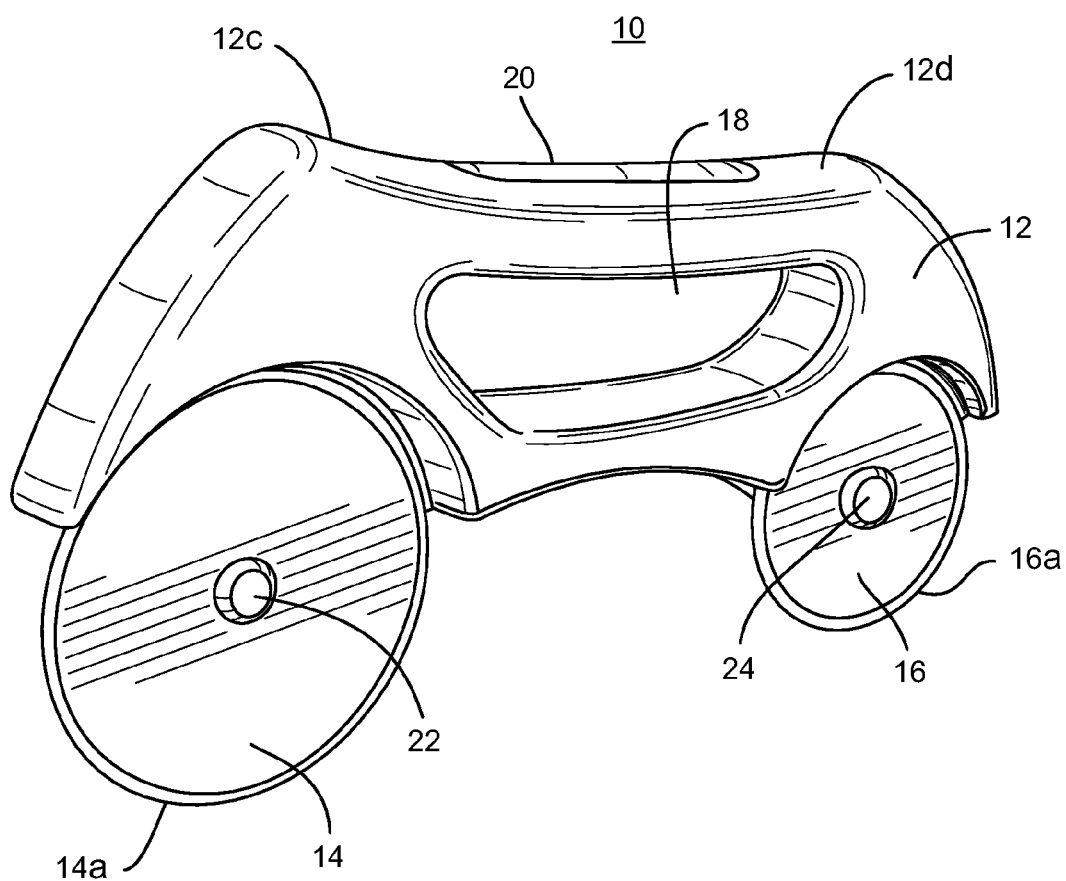
FIG. 2 is a front, left side perspective view thereof.
Figure 3:
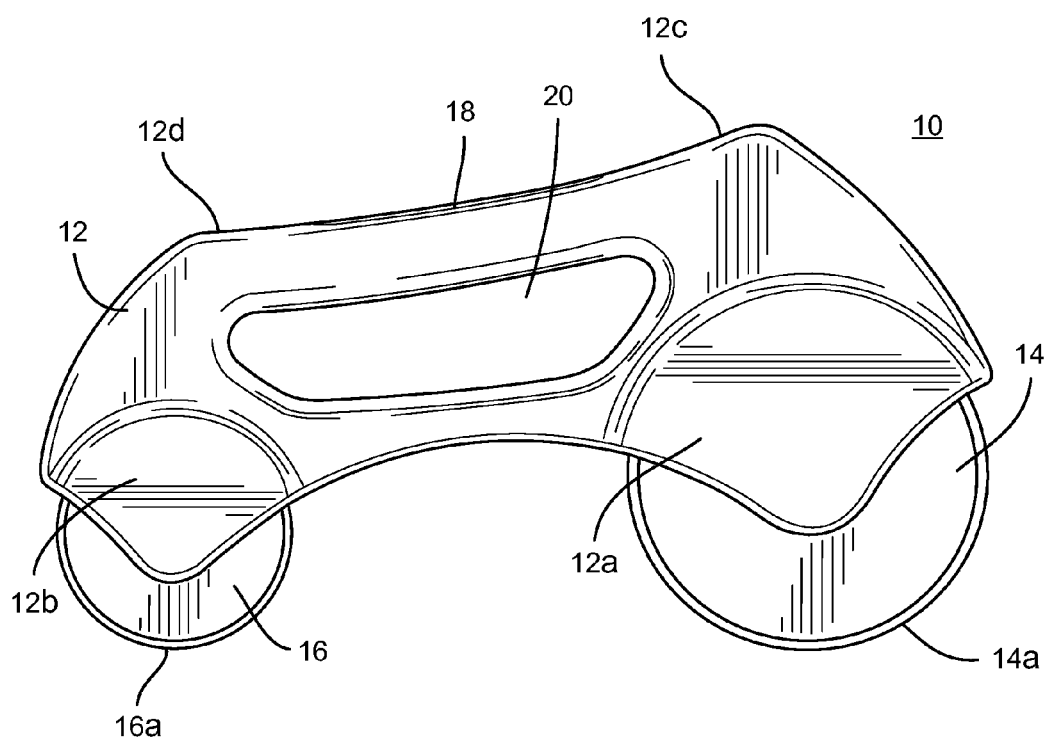
FIG. 3 is a right side elevational view thereof.
Figure 4:
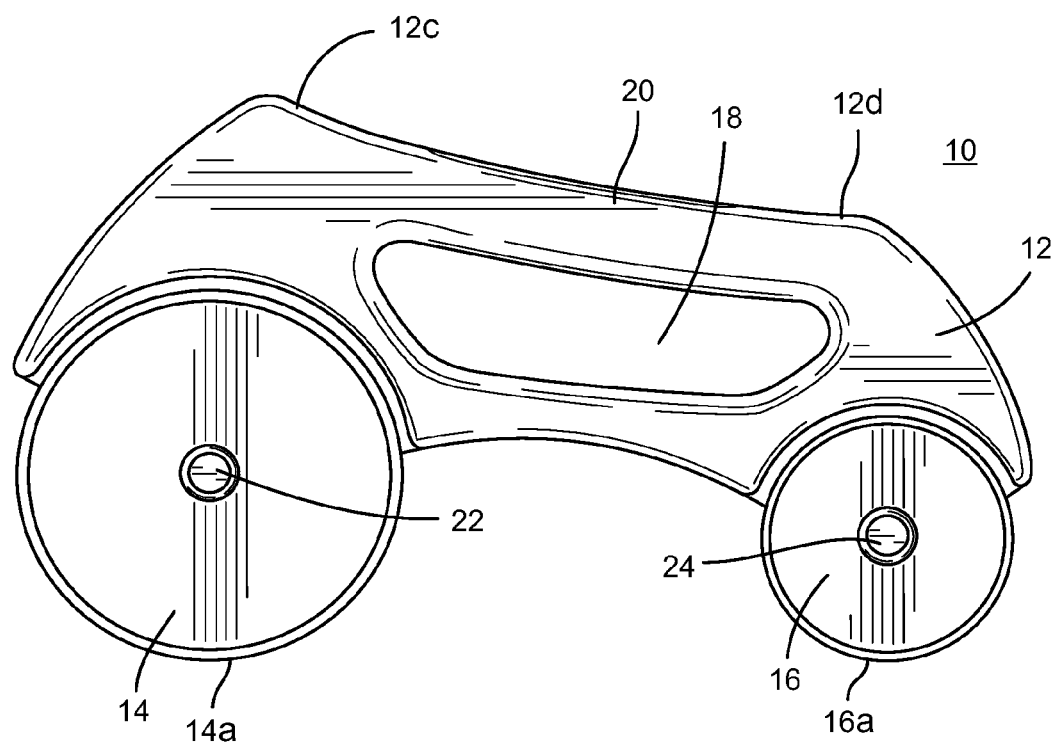
FIG. 4 is a left side elevational view thereof.
Figure 5:
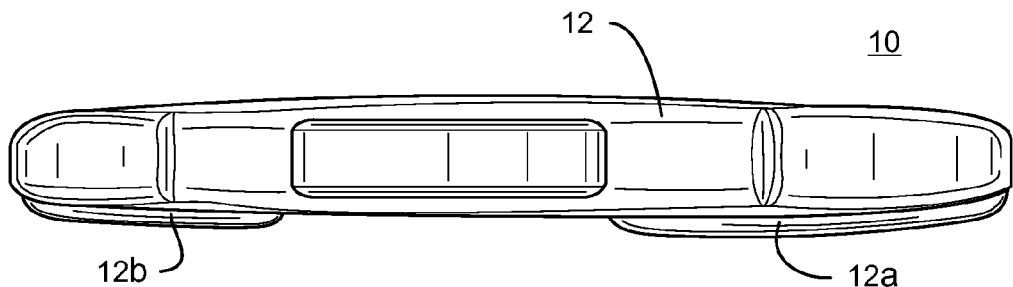
FIG. 5 is a top plan view thereof.
Figure 6:
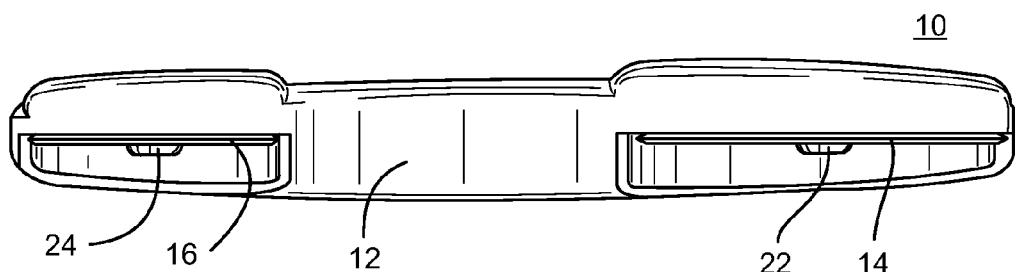
FIG. 6 is a bottom view thereof.
Figure 7:
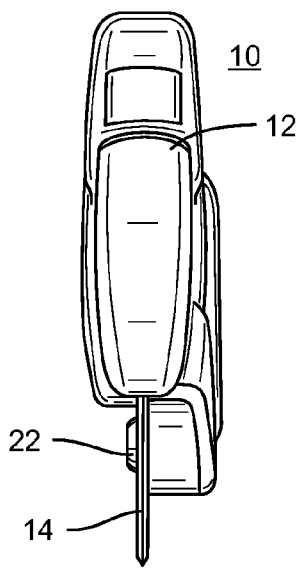
FIG. 7 is a rear elevational view thereof.
Figure 8:
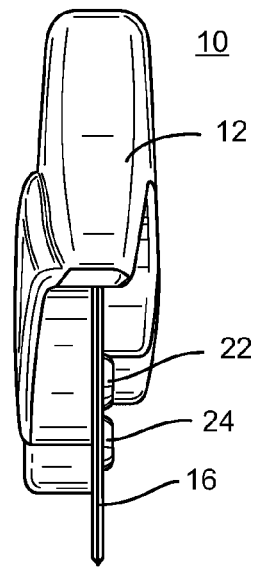
FIG. 8 is a front elevational view thereof.

Referring now to the figures, a novel dual wheel pizza cutter 10 is hereinafter described. Generally, the dual wheel pizza cutter 10 includes a body 12 that rotatably carries a front cutting wheel 14 and a rear cutting wheel 16 on respective axes 22 and 24. The front cutting wheel 14 and the rear cutting wheel 16, constructed from a stainless steel material or the like, each include a cutting edge 14a and 16a that is adapted to slice through a pizza, pastry, or the like. The body 12 may be constructed from a plastic material or other material as desired, preferably dishwasher safe. As best seen in FIGS. 1 and 2, the cutting wheels 14 and 16 may be exposed on one side thereof (FIG. 2) while partially covered on the other side thereof (FIG. 1). To this end, the housing 12 may have wheel well portions 12a and 12b which extend downward to cover the respective portions of the cutting wheels 14 and 16. The axes 22 and 24 to which the cutting wheels 14 and 16 are mounted may thus be integrally formed with and extend from the interior sides of the wheel well portions 12a and 12b, may be wheel bolts attached to the wheel well portions 12a and 12b, or the like without limitation.

The cutting edges 14a and 16a of the cutting wheels 14 and 16 are preferably aligned in the cutting direction. The aligned cutting wheels 14 and 16 would thus provide improved stability when both wheels 14 and 16 are applied to a surface and the pizza cutter 10 is used, for example, to slice vegetables. The cutting wheels 14 and 16 may also be provided with a diameter of approximately three inches while the rear cutting wheel 16 may be provided with a diameter of approximately two inches with the pizza cutter 10 having an overall length of approximately eight inches and front height of approximately four inches. In this manner, the cutting wheel 14 may be advantageously cut pastries. In such use, it is anticipated that the cutting wheel 14 and 16 not intended to be used could be raised from the cutting surface. Thus, when the pizza cutter 10 is to be used to cut pastries, the pizza cutter 10 could be simply turned around with the cutting wheel 16 being used as the lead cutting wheel and the cutting wheel 14, which is not being used, being lifted from the cutting surface.

To provide for convenient grasping of the pizza cutter 10, a top of the body 12 includes an ergonomic handle 18 and an opening 20 disposed intermediate the front cutting wheel 14 and rear cutting wheel 16. The opening 10 allows the fingers of a user to envelope the handle 18 when the handle 18 is grasped to cut/slice an item. Adjacent to the handle 18, the body 12 may be provided with upswept corners 12c and 12d which are positioned over the respective cutting wheels 14 and 16. The upswept corners 12c and 12d may be positioned slightly to the interior of each cutting wheel 14 and 16 towards the center of the body 12. As will be appreciated, upswept corner 12c will therefore allow for placement of a user's thumb when cutting wheel 14 is intended to be used in a cutting/slicing operation, e.g., it assists in allowing the cutting wheel 14 to be driven into the item being cut/sliced. Similarly, it will be appreciated that upswept corner 12d allows for placement of a user's thumb when the pizza cutter 10 is reversed with the cutting wheel 16 intended to be used in a cutting/slicing operation, e.g., it assists in allowing the cutting wheel 16 to be driven into the item being cut/sliced.

While a specific embodiment of a dual wheel pizza cutter has been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A pizza cutter, comprising:
   a body portion;
   a front cutting wheel rotatably coupled to the body portion; and
   a rear cutting wheel rotatably coupled to the body portion;
   wherein the front cutting wheel and the rear cutting wheel are aligned in a cutting direction;
   wherein a top of the body portion opposite the front cutting wheel and the rear cutting wheel has a graspable handle;
   wherein the graspable handle includes a curved top surface opposite an opening adapted to receive fingers of a user and thereby allow the graspable handle to be enveloped; and wherein the top surface of the graspable handle is concave between a first upswept corner of the body portion which is positioned generally over the front cutting wheel and which is adapted to receive a thumb of the user when the graspable handle is enveloped for use in a first cutting direction and a second upswept corner of the body portion which is positioned generally over the rear cutting wheel and which is adapted to receive a thumb of the user when the graspable handle is enveloped for use in a second cutting direction opposite the first cutting direction.

2. The pizza cutter as recited in claim 1, wherein the front cutting wheel has a diameter that is larger than a diameter of the rear cutting wheel whereby the graspable handle will be generally angled upwardly from the rear cutting wheel towards the front cutting wheel.

3. The pizza cutter as recited in claim 2, wherein the body portion provides a front cutting wheel well and a rear cutting wheel well and the front cutting wheel well covers a portion of one side of the front cutting wheel, the rear cutting wheel well covers a portion of one side of the rear cutting wheel, and the opposite sides of the front cutting wheel and the rear cutting wheel remain exposed.

4. The pizza cutter as recited in claim 3, wherein the front cutting wheel is rotatably coupled to an interior surface of the front cutting wheel well and the rear cutting wheel is rotatably coupled to an interior surface of the rear cutting wheel well.

5. The pizza cutter as recited in claim 1, wherein the body portion provides a front cutting wheel well and a rear cutting wheel well and the front cutting wheel well covers a portion of one side of the front cutting wheel, the rear cutting wheel well covers a portion of one side of the rear cutting wheel, and the opposite sides of the front cutting wheel and the rear cutting wheel remain exposed.

6. The pizza cutter as recited in claim 5, wherein the front cutting wheel is rotatably coupled to an interior surface of the front cutting wheel well and the rear cutting wheel is rotatably coupled to an interior surface of the rear cutting wheel well.

* * * * *